United States Patent [19]

Rosso

[11] 4,340,938
[45] Jul. 20, 1982

[54] NET OIL COMPUTER

[75] Inventor: John B. Rosso, Tulsa, Okla.

[73] Assignee: Combustion Engineering, Inc., Windsor, Conn.

[21] Appl. No.: 166,207

[22] Filed: Jul. 7, 1980

[51] Int. Cl.³ .............................................. G01F 1/00
[52] U.S. Cl. ................................ 364/510; 73/61.1 R; 73/861.04; 235/92 FL
[58] Field of Search ............................. 364/510, 550; 73/61.1 R, 861.04; 235/92 FL

[56] References Cited

U.S. PATENT DOCUMENTS

| 3,385,108 | 5/1968 | Rosso | 364/510 X |
| 3,660,644 | 5/1972 | Hammond et al. | 364/510 X |
| 3,906,198 | 9/1975 | November | 364/510 X |
| 3,934,471 | 1/1976 | White et al. | 364/510 X |
| 4,055,082 | 10/1977 | November | 364/510 X |
| 4,059,744 | 11/1977 | Elderton | 364/510 X |

Primary Examiner—Edward J. Wise
Attorney, Agent, or Firm—Arthur L. Wade

[57] ABSTRACT

Voltage pulses, whose frequency represents the flow rate of a stream of oil well production fluids, generate a train of clock pulses. Each train of clocked pulses is characterized into a non-linear analog ramp and compared with a matching non-linear analog signal representative of the percentage of water in the oil/water mixture of production fluids. The comparison controls a gate to distribute each train of clocked pulses between two digital indicators.

4 Claims, 1 Drawing Figure

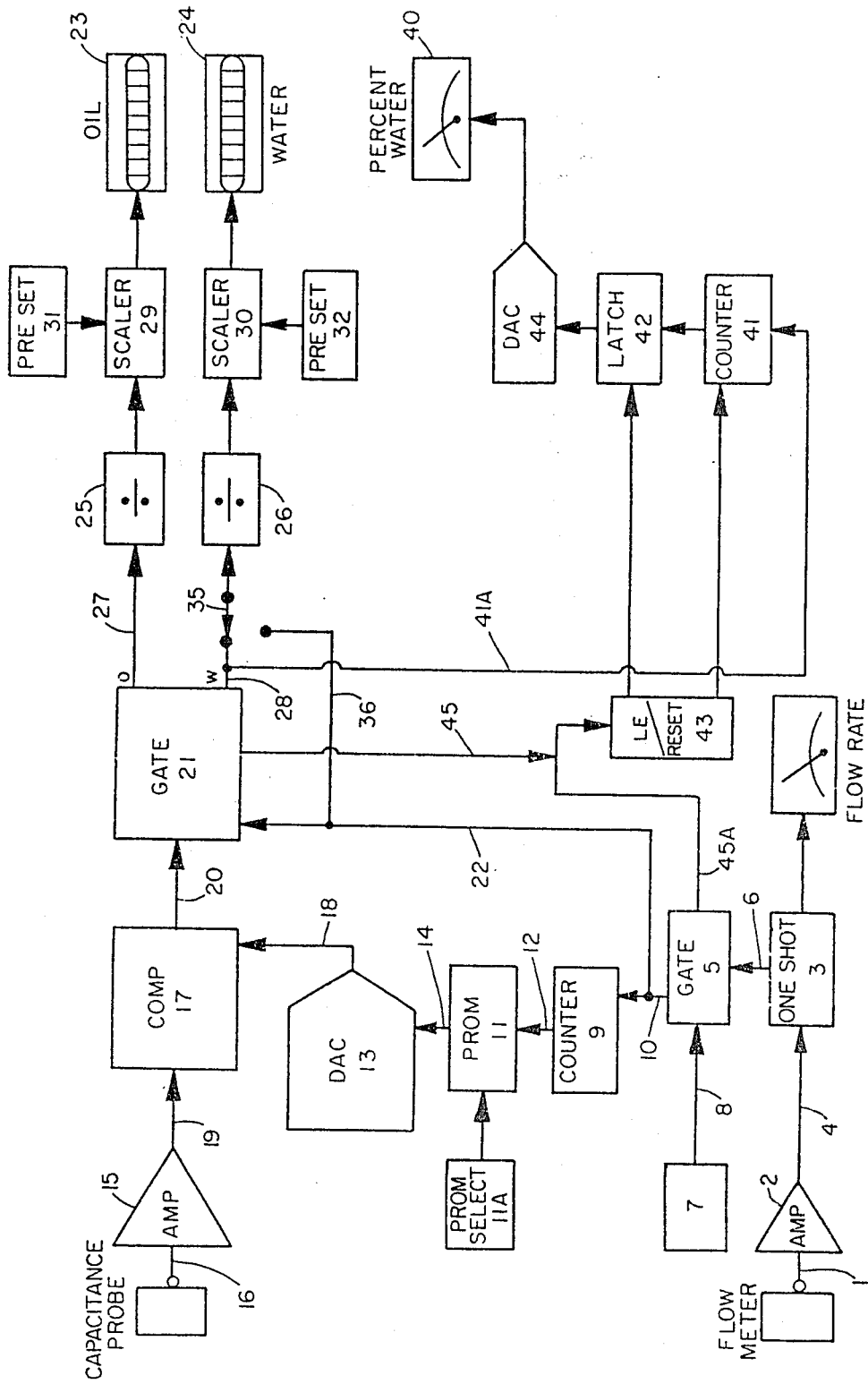

NET OIL COMPUTER

TECHNICAL FIELD

The present invention relates to coordinating voltage pulses generated by a rate of flow of a mixture of oil and water in manifesting the relative quantity values of the oil and water. The invention further relates to the electronic comparison of each voltage pulse, representative of a total quantity of an oil/water mixture, with the non-linear analog signal value generated by the dielectric constant of the oil/water mixture.

BACKGROUND ART

Twenty-five or thirty years ago it became important to continuously detect the percentage of oil and water, or the percent of water and oil, in streams of well production. The well-producing facilities were being rapidly automated and one of the main lynch pins in the measurement of these systems was the arrangements for detecting percentages of oil and water in the stream. Continuous measurement of large flowing volumes of oil well production required increasingly accurate information on how much water was to be accounted for, and/or eliminated from, the well stream.

The industry recognized, from the beginning, that there was great promise in the use of a capacitance as a primary element responsive to the dielectric constant of the oil/water mixtures. Circuits with which to develop an analog voltage from a capacitance was relatively simple. There were many misunderstandings, misapplications and crude attempts to bring the capacitance into consistent contact with the mixtures.

Slowly, by fits and starts, sample systems were improved and an understanding of the dielectric constant of the mixtures accumulated. As an example, the effect of a phase reversal from water-in-oil to oil-in-water on the measurement system was appreciated. Eventually, the electric analog signal over a predetermined range of variation was produced as a dependable measurement tool. However, coordination of this instantaneous measurement with that of the flow rate of the mixture took additional time.

Direct measurement of flowing mixtures of oil and water is simple in principle. However, there was a fairly lengthy development period to gain a simple switch closure by an acceptable form of meter. Eventually, the positive displacement (P.D.) meter and turbine meter designs have been developed and accepted by the industry to the point where their simple closure of switches is regarded as a reliable structure with which to generate voltage pulses whose frequencies represent the rate of flow of the mixture passing through the meter. Finally, it has been generally recognized that with the non-linear analog signal of the capacitance probe and the flow pulses of the flow meter, there remains only the problem of coordinating these two measurements to provide continuous manifestation of the relative quantities of oil and water in the mixture.

In the past, it has appeared satisfactory to generate a voltage over a finite range with a predetermined rate of increase to compare with the capacitance analog signal. It proved a fairly simple electronic manipulation to compare this ramp voltage with the capacitance analog signal and distribute the voltage flow pulses in proportion to the division of the ramp by the capacitance analog signal. More simply stated, with a voltage ramp developed over a finite period between one and two seconds, that portion of the ramp up to the value of the capacitance analog signal would direct flow pulses to one register. That part of the ramp beyond the value of the capacitance analog signal would direct subsequent flow pulses to a second register. Therefore, the ramp would be divided by the capacitance analog signal into a water portion and an oil portion, those portions being represented by the quantity of flow pulses distributed to the registers by each portion. The drawback to this system is, that the capacitance analog signal is varying so quickly that the distribution of flow pulses is a relatively crude, or inaccurate, representation of the oil and water quantities in the mixture.

Additionally, the non-linearity of the capacitance analog signal over the predetermined range of dielectric constant variation must be compatible with the ramp over a comparable range. Obviously, the non-linearity of the capacitance analog signal and the linear variation of the ramp signal would introduce error in the flow pulse distribution. Either the ramp signal had to be given a comparable non-linear variation, or the capacitance analog signal had to be linearized.

At this point in the development of the art, it is desired to coordinate each flow pulse with the nonlinear capacitance analog signal to make a fine resolution with which to actuate the manifesting meters for the oil/water quantitative relationship in the mixture. A circuit is needed which will break each voltage pulse into a large number of fragments and distribute these components accurately between a water meter and an oil meter.

DISCLOSURE OF THE INVENTION

The present invention contemplates utilizing each flow voltage pulse from a conventional flow meter through which flows a mixture of oil and water to generate a train of clock pulses. Each clocked train of its flow pulse is converted into a non-linear analog signal over a finite range. The non-linearity of the flow pulse analog signal is matched to the non-linearity of a capacitance output sensing the dielectric constant of the oil/water mixture of the flow stream. The instantaneous value of the analog signal of the capacitance is compared with the non-linear flow pulse analog to divide its clocked pulse train into two groups, one group representing the percentage of oil in the mixture.

Other objects, advantages and features of this invention will become apparent to one skilled in the art upon consideration of the written specification, appended claims, and attached drawing.

BRIEF DESCRIPTION OF THE DRAWING

The drawing is a schematic diagram of the system embodying the present invention.

BEST MODE FOR CARRYING OUT THE INVENTION

Referring specifically to the drawing, a voltage signal representing total flow of a mixture of oil and water produced from a well is indicated by legend at the lower lefthand corner of the drawing. A second voltage signal comes to the system as an analog of the proportion of the water in the oil of the produced stream and this is also indicated by legend in the upper lefthand corner of the drawing.

The connection from the flow meter is indicated as 1, between the flow meter and amplifier 2. This voltage signal, in the form of a series of pulses, is applied to amplifier 2. Amplifier 2 functions to provide a square wave form for each of its input voltage pulses. The amplifier 2 is connected to a one-shot multi-vibrator 3 by connection 4. The multi-vibrator 3 receives the pulses from amplifier 2 and functions to equalize the widths of the pulses in its output. The series of shaped flow pulses, varying in frequency with the flow rate, are then applied to gate 5 through connection 6 to gate trains of clock pulses.

The output voltage pulses of clock 7 are also fed to gate 5 through connection 8 where each flow pulse from multi-vibrator 3 establishes the train of clock pulses. Gate 5 is then connected to binary counter 9 by connection 10. The binary output data of counter 9 feeds into a prom circuit 11 (programmable read only memory) through connections indicated by 12.

The prom circuit 11 is preprogrammed to give each pulse train received, predetermined non-linearity. The output of the prom 11 is then applied to an eight bit DAC 13 (digital to analog converter) through connection 14. This device converts the non-linear digital output of the prom circuit 11 to a correspondingly non-linear analog output for comparison with the capacitance measurement.

Shifting attention, now, to the amplifier 15, connection 16 indicates receipt of the analog voltage signal of a capacitance probe, the capacitance probe being the primary element responding to the oil/water mixture of the produced stream. The response to the varying dielectric constant of the produced stream is non-linear over its range. That is, the range of the analog signal is not proportional to the variation of the water in oil of the produced stream. This non-linear variation of the analog signal is that predetermined non-linearity programmed into prom 11. Therefore, comparison circuit 17 receives the non-linear analog ramp output of DAC 13 through conconnection 18 and compares it to the instantaneous value of the analog signal from the capacitance probe through connection 19.

The output of comparison circuit 17 is applied, through connection 20, to gate 21 which also receives the same clocked pulse train, through connection 22, previously passed to the binary counter 9 from gate 5. The clocked pulse train of gate 5 is broken into two groups in gate 21 by the comparison of analog signals in comparison circuit 17. As the non-linear analog signal ramp of DAC 13 increases to the instantaneous value of the analog signal from the capacitance, the clocked pulses from gate 5 are broken out into a first group. After the two non-linear values reach equality in comparison circuit 17, the comparison circuit 17 switches gate 21 to throw the remaining pulses of the clocked train into a second group. The circuit is arranged to form a first group as a representation of water in the mixture. These two clocked pulse groups of the train are then transmitted by separate connections to indicators 23 and 24 for separate manifestation of the oil and water quantaties in the produced stream.

The Frequencies Involved

It is the speed with which these units function that staggers the mind. For the first time in the development of this measurement art, electronic tools are available which can satisfactorily resolve the voltage flow pulses by the dielectric constant sensing. Dependable electronic clocks, represented by 7, can be triggered by the flow pulses to produce bursts, or trains, of hundreds of pulses which can be programmed into non-linearity to precisely match the non-linearity of capacitance probes sensing dielectric constant variations of the oil/water mixture. Some idea of the blinding speed with which the voltage pulses of flow can be resolved by this system can be garnered from the frequencies involved.

Return to the frequency of the clock 7 pulses. Since a net oil computation is made for each flow meter pulse, the clock frequency must be properly selected. 256 clock pulses are practical for the train to be clocked by each flow pulse. Consider, for the moment, a normally expected maximum output of 1,000 flow pulses per second. Therefore, the duration of one input flow pulse is one millisecond. If 256 clock pulses are to occur during this flow pulse period, the clock period must be 0.001 sec./256 or 3.091 microseconds. The clock frequency would then be $1/3.091 \times 10^{-6}$ or 256 KHz, (250,000 cycles per second). Using standard components, the clock frequency was chosen to be 320 KHz. The clock period is $1/320 \times 10^3$ or $3.125 \times 10^{-6}$ microseconds. $3.125 \times 10^{-6} \times 256$ gives a total period for 256 pulses of 0.8 milliseconds, $1/0.8 \times 10^{-3} - 1250$ Hz. This is the maximum input that can be accepted from a flow meter with a 320 KHz clock.

The present invention is in no way dependent upon the specific frequency selected for the clock pulses. Nor are the capacities of the binary counters selected limiting. Stunning as the clock period recited may be, it is readily conceivable, in this art, that much smaller periods are practical. The invention is not to be limited in any way except as claimed.

Auxiliary Features

The fundamental form and arrangement of the embodying structure of the invention has been disclosed as producing the end result sought. The flow signal on connection 1 and the capacitance signal on connection 16 have been processed, or interpreted, into the readings on indicators 23 and 24. An addition to this fundamental embodiment of the invention, there are several important supplemental structures producing desirable results.

First, review the manipulation at gate 21 of each clocked pulse train received on connection 22 from gate 5. In the first instance, this manipulation was described as the 256 clocked train pulses being divided into two groups. Each group was separately directed to indicators 23 and 24. If the water content of the mixture was 50%, the output of gate 21 would be 128 water pulses and 128 oil pulses. This means that each of the flow pulses on connection 1 was multiplied by 256 because each of these flow pulses generate 256 gated clock pulses. Each pulse train from gate 21 must be divided by 256 to return to the original "K" factor, or pulses per unit volume metered. This division by 256 is accomplished by units 25 and 26 which are connected to gate 21 through connections 27 and 28. The output of these dividing units 25 and 26 is connected to scalers 29 and 30 with two "K" factor pre-set switches 31 and 32. The scaler outputs are connected to the counter driver circuitry of oil and water counters 23 and 24.

A switch 35 has been provided in connection 28 so that counter 24 can be made to indicate either the total water in the flowing mixture, or the total flow of the mixture. This switch simply bypasses gate 21 with the clocked pulses from gate 5 and connects the counter 24 directly with the pulses of connection 22 through connection 36. The result is that the input flow signal on connection 1 is connected to the counter 24 through the divider 26 and scaler 30. This preferred mode of the invention readily provides this dual service for water indicator 24.

The embodying circuit of the invention also enables the linearized percentage of the water in the mixture to be manifested through a sub-circuit. In review, the number of water pulses in the gate 21 output for each gating cycle is directly proportional to the water content in the mixture, related to the total of 256 possible pulses. This sub-circuit is connected to meter 40 to manifest the pulses supplied it as the percentage of water which they represent. These pulses are picked up from gate 21 and fed to binary counter 41 by connection 41-A. The output of binary counter 41 is a binary number (eight bits). This binary output is connected to the input of eight-bit latch 42. The latch retains the data between flow meter pulses and gating cycles. At the end of the gate cycle, the latch 42 is enabled by LE/RST 43 (latch enable reset). At the same time, the gated output of clock 7 is interrupted through connection 45-A to gate 5. The data now appears as the input of the eight bit DAC 44. The output of the DAC 44, as an analog signal, drives the meter 40. This analog signal is a 0-5 volt DC signal linearly proportional to water content.

When the gate 21 signal on connection 45 enables the latch 42 through LE/RST circuit 43, the counter 41 is reset to zero and awaits the next group of pulses which will be generated by the next flow meter pulse on connection 1. The latch 42 and DAC circuit 44 will maintain the percent water reading until the next flow meter pulse causes the complete cycle to repeat.

Conclusion

In disclosing this type of invention, it is necessary to represent many structures as simply well-known, self-contained units whose internal arrangement and function are well-known, off-the-shelf hardware. In representing such structure on drawings, it is acceptable to use "black-box" symbols. To preserve the pedagogical integrity of the present disclosure, many units of the system are depicted in this manner.

The art of measurement and control is well developed. Therefore, the volume meter and primary element, including the capacitance, are perfunctorily represented at the lower lefthand corner and the upper lefhand corner of the drawing. Likewise, amplifier 2 and amplifier 15 are simply outlined. One-shot multi-vibrator 3 is simply a block. The form and structure of clock 7 and gates 5 and 21 are somewhat more complex, but well-known structures to those skilled in this art.

It may be questioned that to represent prom circuit 11 in no more detail than shown, provides an inadequate teaching disclosure. Although of comparatively recent origin, it seems generally recognized that the input to these circuits are digital in character and the output can be manipulated readily with pre-set programs.

In the present disclosure, it is emphasized that a prom unit 11 is available to contain multiple programs. Any of these programs could be selected by the prom selector switch 11-A so that the non-linearity of the circuit output can match the non-linearity character of the analog signal generated by the capacitance primary element.

The invention of the disclosed circuit is found in the structure and interlocking function of hardware which might be generally looked upon as standard, well-known building blocks. However, it was suddenly conceived that the manipulation of the input voltage flow pulse and the dielectric constant analog signal could be brought about with simplicity and accuracy in the circuits as disclosed. The non-linear characterization given the trains of clocked flow pulses was conveniently carried out by the prom circuit 11. It was necessary to produce an analog ramp signal from each flow pulse, and while doing this, it was more convenient to match the non-linearity of the capacitance circuit than go through the steps necessary to linearize the capacitance signal.

In defining the invention, there is great flexibility in grouping units of the circuit to arrive at a satisfactory result. For example, the flow meter, amplifier 2, and one-shot 3, can be defined as a first circuit. The clock 7 could be defined as a second circuit. A third circuit could be made up from the prom 11 and DAC 13. These three networks could be defined as connected to pass the voltage flow pulses up to comparison circuit 17 in the form of a non-linear analog ramp to be compared with a fourth circuit analog output of the dielectric constant. Finally, gate 21 could be defined as a fifth circuit receiving the train of clocked flow pulses and distributing them in accordance with the comparison of the analog signals in circuit 17. However, this grouping of the circuits and their interlocking descriptions is only one way of defining the invention which produces the final result of manifesting quantities of oil and water in the produced stream.

Index to Structure

As a device to avoid confusion, the numerals utilized to designate the structural components in which the present invention is embodied are listed below for reference.

| | |
|---|---|
| 1 - flow meter | 20 - connection |
| 2 - amplifier | 21 - gate |
| 3 - multi-vibrator | 22 - connection |
| 4 - connection | 23 - indicator |
| 5 - gate | 24 - indicator |
| 6 - connection | 25 - dividing unit |
| 7 - clock | 26 - dividing unit |
| 8 - connection | 27 - connection |
| 9 - binary counter | 28 - connection |
| 10 - connection | 29 - scaler |
| 11 - prom circuit | 30 - scaler |
| 12 - connection | 35 - switch |
| 13 - DAC | 36 - connection |
| 14 - connection | 40 - meter |
| 15 - amplifier | 41 - counter |
| 16 - connection | 42 - latch |
| 17 - comparison circuit | 43 - LE/RST circuit |
| 18 - connection | 44 - DAC (eight bit) |
| 19 - connection | 45 - connection |

From the foregoing, it will be seen that this invention is one well adapted to attain all of the ends and objects hereinabove set forth, together with other advantages which are obvious and inherent to the apparatus.

It will be understood that certain features and sub-combinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawing is to be interpreted in an illustrative and not in a limiting sense.

The invention having been described, what is claimed is:

1. A net oil computer, including,
a flow meter for sensing the rate of flow of a mixture of oil and water and establishing an output of voltage pulses with a frequency representative of the rate of flow,
an electronic clock establishing an output of voltage pulses at a constant frequency substantially greater than the frequency of the flow pulses,
a first gate receiving both the clock pulses and the flow pulses arranged to divide the flow pulses into trains of clock pulses,
a binary counter receiving the clocked trains of pulses and establishing each train as a separate output,
a prom circuit connected to the binary counter programmed to receive each clocked pulse train in the form of binary data and establishing a nonlinear output of the binary data,
a digital-to-analog converter connected to the prom circuit to receive the output of the prom circuit and convert it to a voltage ramp output,
a primary element capacitance arranged to respond to the flowing mixture of oil and water to establish an analog signal output with the non-linearity matching that of the prom output,
a comparing circuit connected to the capacitance circuit and the pulse train analog circuit to establish an output divided by each portion of the ramp as determined by the value of the capacitance circuit signal,
a second gate receiving the clocked pulse trains and the output of the comparison circuit and dividing each train into two quantitative parts proportional to the division of the ramp analog signal,
and means to manifest each portion of the pulse train divided by the gate as the quantities of oil and water of the mixture sensed by the capacitance.

2. An electronic network with which to manifest the relationship between the oil and water quantities of a mixture of the liquids, including,
a first circuit arranged to respond to the rate of flow of the mixture of liquids and produce voltage pulses whose frequency is representative of the flow rate,
a second circuit connected to the first circuit to receive the flow pulses and produce a predetermined number of clocked pulses for each flow pulse,
a third circuit connected to the second circuit receiving each clocked pulse train in the form of binary data and establishing a first analog voltage which is formed with the binary data as a predetermined non-linear ramp of increasing values,
a fourth circuit responsive to the dielectric constant of the flowing mixture of liquids and establishing a second analog signal with a non-linear variation matching that of the first analog signal,
a fifth comparison circuit connected to the third and fourth circuits to receive the two analog signals and dividing the first analog ramp signal into two parts proportional to the oil and water quantities of the mixture,
a gate circuit connected to the fifth circuit and the second circuit to receive each clocked pulse train and divide its pulses into two groups proportional in size to the division of the first analog ramp by the instantaneous value of the second analog signal,
and two indicator circuits connected to the gate circuit to separately receive the pulses into which each clocked pulse train is divided and manifest their quantities separately as the oil and water quantitative proportions in the mixture of liquids.

3. A net oil computer electric network for detecting and manifesting the oil/water content of a mixture of the liquids, including,
a first electric network arranged to respond to the flow rate of a stream of an oil and water mixture to produce voltage pulses with a frequency proportional to the flow rate,
an electronic clock continuously producing voltage pulses,
a first gate circuit connected to the first electric network and the electronic clock to gate 256 clock pulses by each flow pulse,
a binary counter connected to the gate to receive the clocked pulses and to establish a binary data output of the 256 clocked pulses,
a prom circuit connected to the binary counter to receive the binary data output and establish an output of the binary data in non-linear form,
a digital-to-analog converter connected to the prom circuit to receive the non-linear form of binary data and convert it into an analog signal in the form of a voltage increasing over a finite period of time in the non-linear program,
a circuit responsive to the variations in the dielectric constant of the oil/water mixture and producing an analog output which will vary over the range of dielectric constant in accordance with the predetermined program of the prom circuit,
means for comparing the ramp voltage output generated from the clocked pulse train and the instantaneous value of the dielectric constant analog to produce a first signal during the period of time the dielectric constant analog signal exceeds the ramp signal and produces a second signal during the period of time the ramp signal exceeds the dielectric constant analog signal,
a second gate connected to the comparing means to receive the first and second output signals of the comparing means and the 256 clocked pulses before their non-linearization to establish a first output of those of the 256 clocked pulses produced during the time of the first signal and producing those remaining clocked pulses occuring during the duration of the second signal,
and manifesting means responsive to each group of the 256 clocked pulses produced during the two signals to manifest the different quantities of oil and water existing in the stream of the mixture at the time of sensing their dielectric constant.

4. A network for manifesting the oil and water content of a stream of their mixture, including,
a first circuit responsive to the stream and establishing voltage pulses at a frequency proportional to the rate of the stream flow,
a second circuit connected to the first circuit to generate a train of pulses for each flow voltage pulse,
a third circuit connected to the second circuit and generating an analog voltage rising over the finite period of time each pulse train is generated,
a fourth circuit responsive to the dielectric constant of the oil/water mixture and generating an analog voltage within the range of the analog signal of the third circuit,
a fifth circuit connected to the fourth and third circuits to compare the analog signals and generate a signal on each side of their equality for the time period of the cycle of the signal of the third circuit, a sixth circuit connected to the 5th circuit and the second circuit to group the pulse train in the output of the second circuit into two groups of pulses, first and second indicator circuits connected to the sixth circuit to receive the two groups of each pulse train and manifest each group as the quantity of water and the quantity of oil in the mixture, a binary counter connected to the indicator circuit from the sixth circuit which represents the water in the mixture, a latch connected to the output of the counter to receive and store those pulses of each train from the sixth circuit, a DAC connected to the latch to receive the water voltage pulses as passed through the latch from the counter, a meter connected to the DAC to receive the analog voltage generated from the water voltage pulses and manifest the analog voltage as a percentage of the water in the mixture, and a latch enable/reset circuit connected to the sixth circuit and the counter and the latch to reset the counter at the completion of each flow pulse cycle and enable the latch to pass the water voltage pulses during each flow pulse cycle.

* * * * *